Jaquith & Calhoun,
Sash Cord Sheave.
Nº 92,453.      Patented Jul 13. 1869.
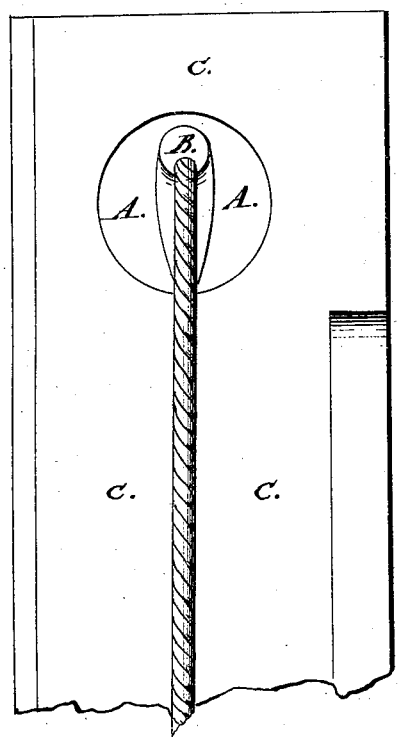
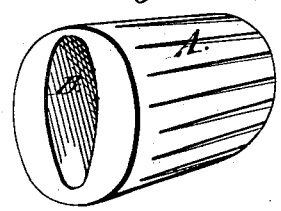
Witnesses:
Charles Calhoun
B. Louther
Inventor:
W. T. Jaquith
Robert Calhoun

United States Patent Office.

W. T. JAQUITH AND ROBERT CALHOUN, OF ALLEGHENY, PENNSYLVANIA.

Letters Patent No. 92,453, dated July 13, 1869.

IMPROVED SASH-CORD SHEAVE.

The Schedule referred to in these Letters Patent and making part of the same.

Be it known that we, ROBERT CALHOUN and W. T. JAQUITH, of the city of Allegheny, and State of Pennsylvania, have invented a new and improved Sash-Cord Sheave; and we do hereby declare that the following is a full and exact description thereof, reference being had to the accompanying drawings, and to the letters of reference marked thereon.

The nature of our invention consists in providing a cheap, durable, and complete cord-sheave, made of glass, porcelain, or any other smooth, hard substance, easily adjusted, and not liable to get out of order.

To enable others skilled in the art to make and use our invention, we will proceed to describe the same.

Figure 1 represents our sheave, which, in nature, is a cylindrical piece of glass, porcelain, or other hard substance, flattened on either end, and perforated by a hole, B, through the same, from end to end, the bottom of which is grooved to allow of the free passage of the cord, as shown in the drawing.

Figure 2 shows a section of window-casing C C; end of our sheave in place, A A; and section of cord D.

The sheave is made with exterior longitudinal corrugations, as shown in fig. 1, by which it is held more firmly in place when inserted in the casing C. The mortise in which the sheave A is inserted, is made, as near as may be, of the exact shape of the sheave, so that when the sheave is inserted, the edge of the mortise will be cased by the sheave all around, so as to make a neat, complete, and finished joint in all parts. We are aware that window-sash sheaves have been made cylindrical in shape, except that a groove, for the cord to play in, is made in what is to be the upper side of the sheave, thus breaking the continuity of the circular edge of the end of the sheave as a casing to the mortise in which it is to be inserted.

What we claim as our invention, is—

A cylindrical, perforated, and grooved sheave, having exterior longitudinal corrugations, substantially as described, as a new article of manufacture.

W. T. JAQUITH.
ROBERT CALHOUN

Witnesses:
CHARLES CALHOUN,
B. LOUTHER.